(12) United States Patent
Natori

(10) Patent No.: US 8,180,113 B2
(45) Date of Patent: May 15, 2012

(54) STAIN DETERMINATION APPARATUS, SHEET PROCESSING APPARATUS AND STAIN DETERMINATION METHOD

(75) Inventor: Naotake Natori, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 912 days.

(21) Appl. No.: 12/209,585

(22) Filed: Sep. 12, 2008

(65) Prior Publication Data

US 2010/0034430 A1    Feb. 11, 2010

(30) Foreign Application Priority Data

Aug. 5, 2008   (JP) ................. 2008-202069

(51) Int. Cl.
*G06K 9/00* (2006.01)
(52) U.S. Cl. ...................................... 382/112
(58) Field of Classification Search ............ 382/112
See application file for complete search history.

(56) References Cited

FOREIGN PATENT DOCUMENTS

JP       2002-117400        4/2002
JP       2003091760 A   *  3/2003

* cited by examiner

*Primary Examiner* — Bhavesh Mehta
*Assistant Examiner* — Nirav G Patel
(74) *Attorney, Agent, or Firm* — Pillsbury Winthrop Shaw Pittman, LLP

(57) ABSTRACT

In a stain determination apparatus or sheet processing apparatus, an input processing unit inputs image information containing an inherent variation that is not related to a stain, a feature extracting unit extracts a plurality of feature information items from the image information input by the input processing unit, a separating unit separates a set of the plurality of feature information items extracted by the feature extracting unit into a inherent variation component and another residual component, a determining unit extracts a main component of stain variation indicating a stain degree in the image information input by the input processing unit from the residual component separated by the separating unit and determines a stain degree in the image information based on the magnitude of the extracted stain variation main component.

6 Claims, 9 Drawing Sheets

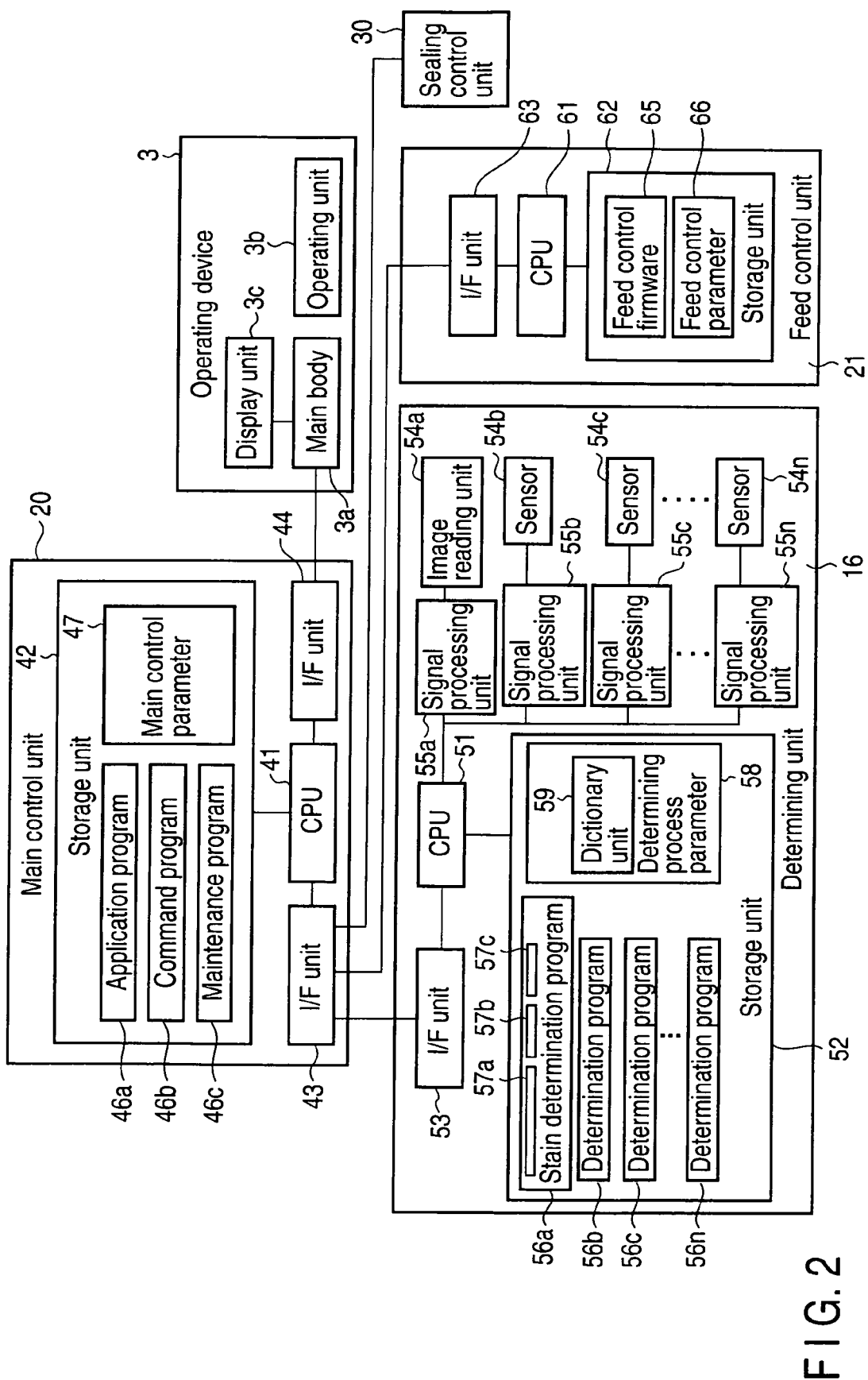
F I G. 2

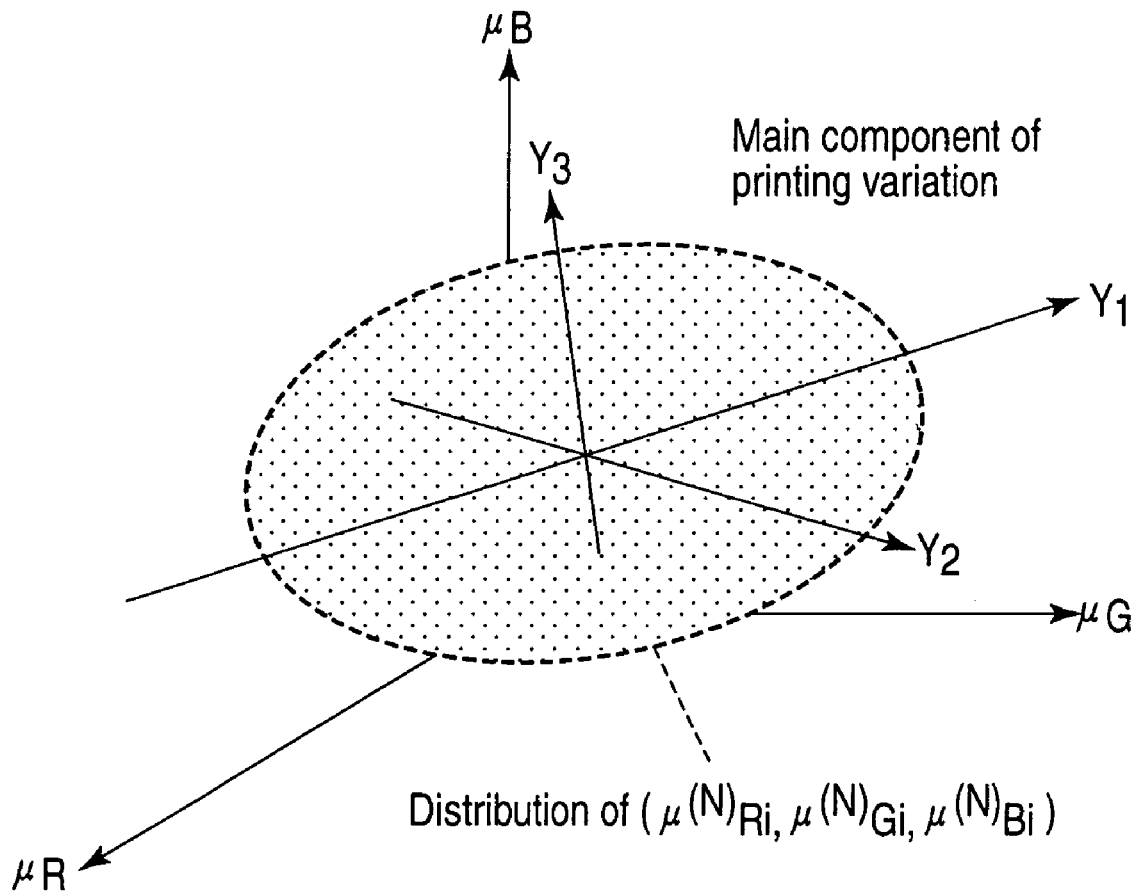
F I G. 5

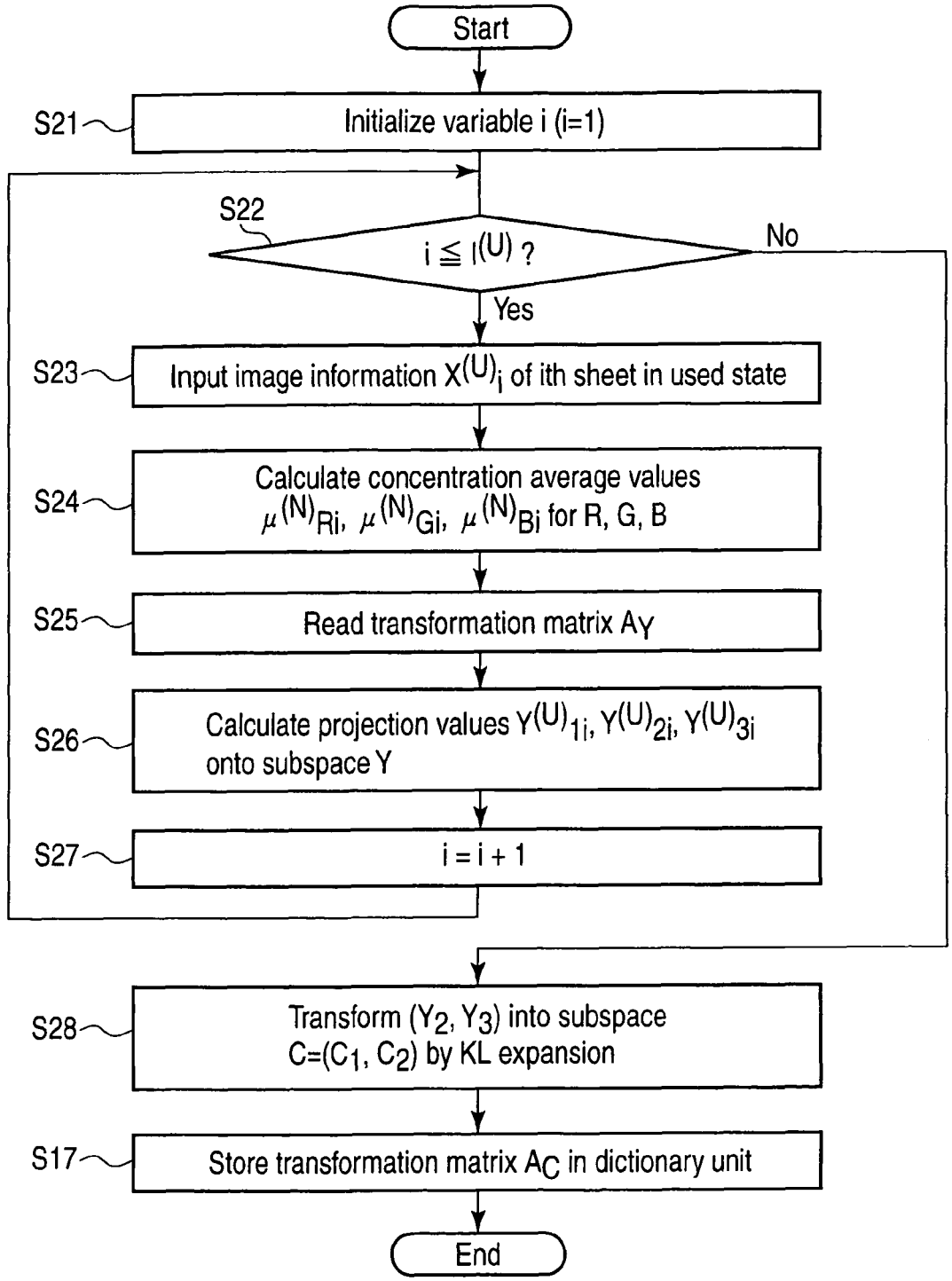
F I G. 6

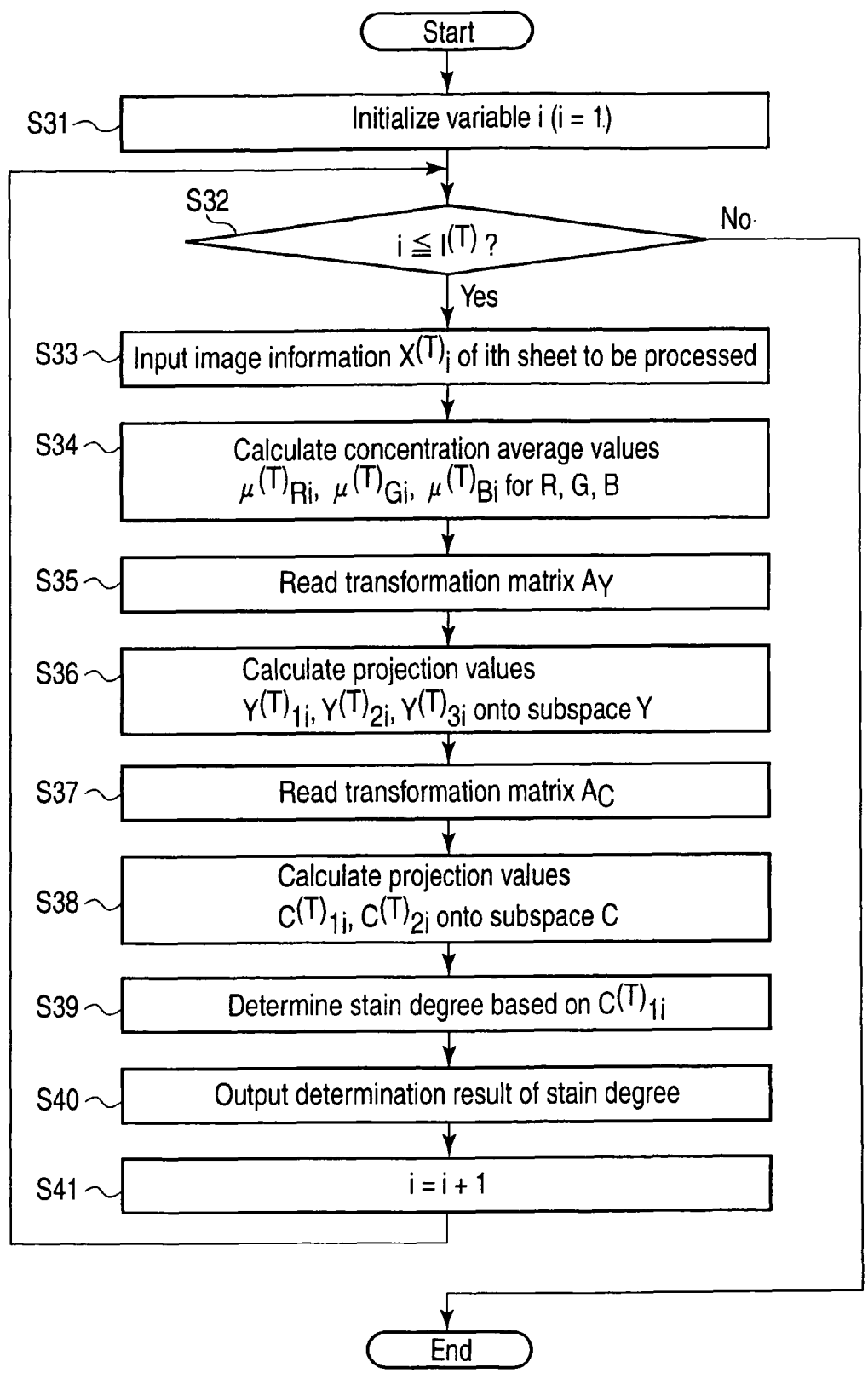
F I G. 8

STAIN DETERMINATION APPARATUS, SHEET PROCESSING APPARATUS AND STAIN DETERMINATION METHOD

CROSS-REFERENCE TO RELATED APPLICATIONS

This application is based upon and claims the benefit of priority from prior Japanese Patent Application No. 2008-202069, filed Aug. 5, 2008, the entire contents of which are incorporated herein by reference.

BACKGROUND OF THE INVENTION

1. Field of the Invention

This invention relates to a stain determination apparatus that determines stain degrees of printed matters such as sheets, a stain determination method and a sheet processing apparatus having the stain determination apparatus.

2. Description of the Related Art

Conventionally, as a method for determining the stain degree of a printed matter, a method for determining the stain degree in an image of a printed matter read by use of a camera or scanner is proposed. For example, there is provided a method for determining the stain degree based on an average value or dispersion value of concentration values in an image read from the printed matter. Further, as a method for determining a variation between a plurality of images, a method using an image analysis process by treating values of red (R), green (G) and blue (B) configuring a color image as 3-dimensional vectors is provided (for example, Jpn. Pat. Appln. KOKAI Publication No. 2002-117400. In this case, it is possible to determine a variation between the images according to distances between the 3-dimensional vectors configured by the values of the three colors of R, G and B. By applying the above method, a method for determining the stain degree of an image read from the printed matter may be considered.

However, it cannot be avoided that a certain variation occurs in the printed matter in the manufacturing process such as a printing process. That is, even in printed matters on which the same patter is printed, variations (that are hereinafter referred to as inherent variation components) caused by factors other than stains may be contained in the printed matters. This means that the concentration average values calculated based on image information items of a plurality of printed matters do not completely coincide even if the same pattern is printed on the printed matters without causing any stain. That is, the variation component inherent to the printed matter acts as a factor that gives a bad influence on the stain degree determination precision.

BRIEF SUMMARY OF THE INVENTION

In one aspect of this invention, an object is to provide a stain determination apparatus, sheet processing apparatus and stain determination method capable of determining a stain degree contained in image information with high precision.

According to one aspect of the present invention, there is provided a stain determination apparatus which includes a feature extracting unit which extracts a plurality of feature information items from image information containing an inherent variation, a separating unit which separates the plurality of feature information items extracted from the image information by the feature extracting unit into an inherent variation component and a residual component other than the above component, and a determining unit which extracts a stain variation component indicating a stain degree in the image information from the residual component obtained by the separating unit and determines a stain degree in the image information based on the magnitude of the extracted stain variation component.

According to another aspect of the present invention, there is provided a sheet processing apparatus which includes a reading unit which reads an image of a sheet on which a specified pattern is printed, a feature extracting unit which extracts a plurality of feature information items from image information of the sheet read by the reading unit, a separating unit which separates the plurality of feature information items extracted from the image information by the feature extracting unit into an inherent variation component and a residual component other than the above component, a determining unit which extracts a stain variation component indicating a stain degree in the image information from the residual component obtained by the separating unit and determines a stain degree in the image information based on the magnitude of the extracted stain variation component, and a processing unit which processes the sheet based on a result of determination of the stain degree by the determining unit.

According to still another aspect of the present invention, there is provided a stain determination method which includes extracting a plurality of feature information items from image information containing an inherent variation, separating the plurality of feature information items extracted from the image information into a component of the inherent variation and a residual component other than the above component, and extracting a stain variation component indicating a stain degree in the image information from the residual component obtained by the separating and determining a stain degree in the image information based on the magnitude of the extracted stain variation component.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram schematically showing an example of the configuration of a control system of the sheet processing system.

FIG. 5 is a diagram schematically showing the relation between feature vectors obtained from image information and a subspace.

FIG. 6 is a flowchart for illustrating the flow of a stain component learning process in the stain determination unit.

FIG. 8 is a flowchart for illustrating the flow of a stain degree determination process in the stain determination unit.

DETAILED DESCRIPTION OF THE INVENTION

There will now be described an embodiment of the present invention with reference to the accompanying drawings.

Figure 1:
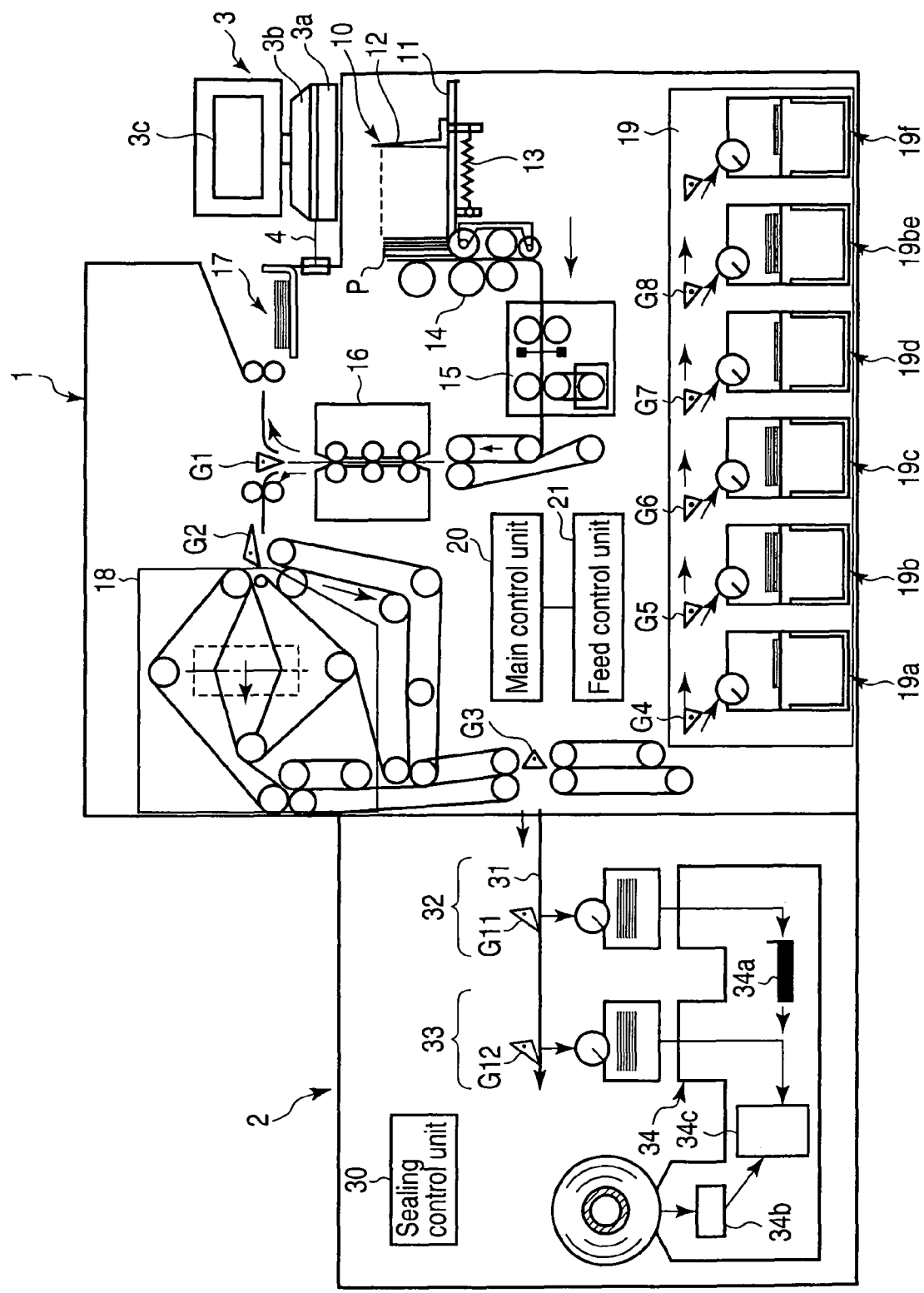
FIG. 1 is a cross-sectional view schematically showing an example of the configuration of a sheet processing system.

FIG. 1 is a cross-sectional view schematically showing an example of the configuration of a sheet processing system according to one embodiment of this invention.

As shown in FIG. 1, the sheet system includes a sorting device 1, sealing device 2 and operating device 3. The sorting device 1 and sealing device 2 are connected via a feeding path used to feed sheets. Further, the sorting device 1 and operating device 3 are connected via a communication line 4 used to perform data communications. The sorting device 1 is a device that performs a sheet checking process, a sheet sorting process based on the result of the checking process and the like. The sealing device 2 is a device that seals sheets supplied from the sorting device 1 for every preset number. The operating device 3 is a device that permits the operator to operate the sorting device 1.

For example, the operating device 3 is configured by a personal computer or the like. The operating device 3 has a main body 3a, operating unit 3b and display unit 3c. The main body 3a controls the whole portion of the operating device 3. The main body 3a has a control unit (not shown), memory, various interfaces and the like. In the main body 3a, the control unit performs various processes according to control programs stored in the memory. Further, the main body 3a has interfaces such as an input/output interface to perform data communications with the sorting device 1, an operating unit interface to acquire information input via the operating unit 3b and a display interface to display-control the display unit 3c. The operating unit 3b is a device that permits the operator to input an operation instruction to the sorting device 1. For example, the operating unit 3b has a keyboard, mouse or touch panel. The display unit 3c is a device that displays a processing result, operation guidance or the like. For example, the display unit 3c is configured by a display device such as a liquid crystal display device.

In the operating device 3 with the above configuration, a processing content is set in the sorting device 1 according to an operation instruction issued by the operator to the operating unit 3b, a process in the sorting device 1 is started in response to an operation instruction issued by the operator to the operating unit 3b, or processing results in the sorting device 1 and sealing device 2 are displayed on the display unit 3c.

The sorting device 1 has a supply unit 10, feed correction unit 15, determining unit 16, reject accumulation unit 17, reversing unit 18, accumulating unit 19, main control unit 20 and feed control unit 21 as main constituents. The constituents of the sorting device 1 are sequentially explained below.

The main control unit 20 controls the whole portion of the sorting device 1. The feed control unit 21 controls the sheet feeding operation in the sorting device 1 according to a feeding instruction from the main control unit 20.

The supply unit 10 supplies a sheet P to be checked. The supply unit 10 has a stage 11, backup plate 12, elastic body 13, takeout roller 14 and the like. On the stage 11, sheets P to be checked are set. The sheets placed on the stage 11 are set in four different directions with respect to the feeding direction. The backup plate 12 arranges the positions of the sheets on the stage 11. The elastic body 13 is configured by an elastic body such as a spring. The takeout roller 14 is provided near the sheet takeout port. The elastic body 13 is fixed at one end near the takeout port and connected to the backup plate 12 at the other end.

The backup plate 12 presses the sheets P on the stage 11 towards the takeout port near which the takeout roller 14 is provided by elastic force of the elastic body 13. Thus, the sheets P on the stage 11 are pressed in a direction to the takeout port near which the takeout roller 14 is provided. The takeout roller 14 takes out the sheets P pressed towards the takeout port one by one. The sheet P taken out by the takeout roller 14 is fed to the feed correction unit 15.

The feed correction unit 15 corrects the feeding state of the sheet P. For example, the feed correction unit 15 corrects the skew (inclination) and slide (positional deviation) of the sheet that is now fed.

The feed correction unit 15 is configured by a plurality of feeding rollers, timing sensor and the like. The sheet P whose feeding state is corrected by the feed correction unit 15 is fed to the determining unit 16.

The determining unit 16 determines whether the sheet is set in the true or false state. The determining process by the determining unit 16 will be described later. The determination result by the determining unit 16 is supplied to the main control unit 20 that controls the sheet feeding operation in the sorting device 1. The main control unit 20 controls the drive operations of gates G1 to G8 provided in respective portions of the sorting device 1 based on the determination result by the determining unit 16.

For example, the gate G1 is a gate that distributes the sheets into reject sheets and process sheets. It is supposed that the reject sheet is a sheet that is determined as "a sheet that cannot be determined" by the determining unit 16. That is, for example, the reject sheet is a sheet determined as a false sheet by the determining unit 16, a sheet determined to have a bent portion, broken portion or skew or the like. The main control unit 20 drives the gate G1 to feed the sheet that is determined as a reject sheet by the determining unit 16 to the reject accumulation unit 17. For example, in the example shown in FIG. 1, the main control unit 20 swings the gate G1 to the right side (clockwise direction) to feed the sheet as the reject sheet to the reject accumulation unit 17.

It is supposed that the process sheet is a sheet that is determined as "a sheet that can be processed" by the determining unit 16. For example, the process sheet is a sheet P that is determined to be a true sheet by the determining unit 16. In this case, it is supposed that sheets P determined as true sheets or process sheets include clean sheets whose stain degree is low and stained sheets whose stain degree is high. For example, sheets that can be re-circulated are determined as clean sheets and sheets that cannot be re-circulated are determined as stained sheets. The main control unit 20 drives the gate G1 so as to subject the sheet determined as the process sheet by the determining unit 16 to a sorting process. For example, in the example shown in FIG. 1, the main control unit 20 swings the gate G1 to the left side (anticlockwise direction) to feed the sheet as the process sheet to the respective units (reversing unit 18, accumulating unit 19 or sealing device 2) in the succeeding stages for the sorting process.

The sheet passing through the gate G1 as the process sheet is fed to the gate G2. The gate G2 is provided in front of the reversing unit 18. The gate G2 is a gate that distributes sheets into sheets that are required to be reversed and sheets that are not required to be reversed. That is, the main control unit 20 determines whether or not the direction of the sheet or the front/rear surface of the sheet must be reversed based on the determination result of the determining unit 16 and the setting state of the accumulating unit 19 or sealing device 2.

The main control unit 20 drives the gate G2 to feed the sheet which is determined that the direction or the front/rear surface thereof is required to be reversed to the reversing unit 18. For example, in the example shown in FIG. 1, the main control unit 20 swings the gate G2 to the right side (clockwise direction) to feed the sheet whose direction or front/rear surface is required to be reversed to the reversing unit 18. Further, the main control unit 20 drives the gate G2 to feed the sheet which is determined that the direction or the front/rear surface thereof is not required to be reversed to the accumulating unit 19 or sealing device 2. For example, in the example shown in FIG. 1, the main control unit 20 swings the gate G2 to the left side (counterclockwise direction) so as not to feed the sheet whose direction or front/rear surface is not required to be reversed to the reversing unit 18.

The reversing unit 18 has a switchback reversing unit (not shown), front/rear surface reversing unit 18a and the like. The switchback reversing unit is a mechanism that reverses the direction of a sheet. The front/rear surface reversing unit 18a is a mechanism that reverses the front/rear surface of a sheet. For example, if only the direction of the sheet is reversed, the direction of the sheet is reversed by the switchback reversing unit in the reversing unit 18. If only the front/rear surface of the sheet is reversed, the front/rear surface of the sheet is reversed by the front/rear surface reversing unit 18a in the reversing unit 18. Further, if both of the direction and the front/rear surface of the sheet are reversed, the direction and the front/rear surface of the sheet are reversed by the switchback reversing unit and front/rear surface reversing unit 18a in the reversing unit 18.

The sheet that has passed through the reversing unit 18 is fed to the gate G3. Further, the sheet that is not required to be reversed and is fed by the gate G2 is fed to the gate G3. The gate G3 is a gate that selectively sets the feeding destination of the sheet to the accumulating unit 19 or sealing device 2. That is, the main control unit 20 determines whether the sheet is fed to the accumulating unit 19 or sealing device 2 based on the determination result of the determining unit 16 and the setting states of the accumulating unit 19 and sealing device 2.

If the main control unit 20 determines that the sheet is fed to the sealing device 2, it drives the gate G3 to feed the sheet to the sealing device 2. For example, in the example shown in FIG. 1, the main control unit 20 swings the gate G3 to the right side (clockwise direction) to feed the sheet to the sealing device 2. Further, if the main control unit 20 determines that the sheet is fed to the accumulating unit 19, it drives the gate G3 to feed the sheet to the accumulating unit 19. For example, in the example shown in FIG. 1, the main control unit 20 swings the gate G3 to the left side (counterclockwise direction) to feed the sheet to the accumulating unit 19.

The accumulating unit 19 has gates G4 to G8 and accumulation boxes 19a to 19f. The gates G4 to G8 are gates that distribute the sheets to the respective accumulation boxes 19a to 19f. The gates G4 to G8 distribute sheets to be accumulated in the respective accumulation boxes 19a to 19e and sheets other than the above sheets. For example, when a sheet is accumulated in the accumulation box 19a, the main control unit 20 drives the gate G4 to distribute the sheet to the accumulation box 19a. Likewise, when sheets are accumulated in the respective accumulation boxes 19b to 19e, the main control unit 20 drives the gates G5 to G8 to distribute the sheets to the respective accumulation boxes 19b to 19e. Further, when a sheet is accumulated in the accumulation box 19f, the main control unit 20 drives the gate G8 to distribute the sheet to the accumulation box 19f.

The main control unit 20 determines the accumulation box into which a sheet is to be accumulated based on the determination result by the determining unit 16. For example, if sheet types of sheets are allocated to the respective accumulation boxes 19a to 19f, the main control unit 20 determines the accumulation box into which a sheet is to be accumulated based on the determination result of the sheet type by the determining unit 16.

Each accumulation box has an impeller, temporary accumulation box, shutter, cassette, pusher and the like. In each accumulation box, the sheet P is accumulated in the temporary accumulation box while kinetic energy of the sheet fed is being absorbed by the impeller. The sheet accumulated in the temporary accumulation box drops into the cassette by opening the shutter. The sheet that has dropped into the cassette is pushed to the deep portion of the cassette by the pusher.

The sealing device 2 includes a sealing control unit 30, main feeding path 31, first accumulating unit 32, second accumulating unit 33, sealing mechanism 34 and the like. The sealing control unit 30 controls the internal portion of the sealing device 2. The main feeding path 31 feeds a sheet fed from the sorting device 1. The sheet fed along the main feeding path 31 is distributed to the first accumulating unit 32 or second accumulating unit 33 by the gate G11 or G12. For example, the gate G11 is a gate that feeds the sheet fed along the main feeding path 31 to the first accumulating unit 32. That is, the sealing control unit 30 drives the gate G11 to feed the sheet to the first accumulating unit 32.

Each of the first accumulating unit 32 and second accumulating unit 33 includes an impeller, temporary accumulation box, backup plate and the like. In the first accumulating unit 32 and second accumulating unit 33, the impeller accumulates the sheet into the temporary accumulation box while absorbing kinetic energy of the sheet. A preset number of sheets (for example, 100 sheets) accumulated in the temporary accumulation box are transferred to a sealing tray 34a in the sealing mechanism 34 by use of the backup plate that can be moved up and down.

The sealing mechanism 34 includes the sealing tray 34a, printing unit 34b, tape winding unit 34c and the like. In the sealing mechanism 34, a preset number of sheets supplied from the backup plate are placed on the sealing tray 34a. The printing unit 34b has a printing mechanism and tape feeding mechanism. The printing mechanism prints preset items on a paper tape used to seal the preset number of sheets placed on the sealing tray 34a. The paper tape subjected to the printing process by the printing mechanism is fed to the tape winding unit 34c by the tape feeding mechanism. The tape winding unit 34c winds the paper tape fed from the printing unit 34b around the preset number of sheets placed on the sealing tray 34a.

FIG. 2 is a block diagram schematically showing an example of the configuration of a control system of the sheet processing system configured as described above.

As shown in FIG. 2, the main control unit 20 is connected to the determining unit 16, feed control unit 26, sealing control unit 40 and operating device 3.

The main control unit 20 is supplied with an operation instruction from the operating unit 3. Further, the main control unit 20 has a function of transmitting information indicating the processing result of a sheet containing the determination result by the determining unit 16 in the sorting device 1 or sealing device 2 to the operating device 3. The main control unit 20 receives the determination result with respect to the sheet P from the determining unit 16. The main control unit 20 also has a function of transmitting a setting value or the like used for a determining process corresponding to a processing mode to the determining unit 16. The main control unit 20 controls the feed control unit 21 and sealing control unit 30. The main control unit 20 transmits an instruction of the feeding process for the sheet to the feed control unit 21. Further, the main control unit 20 has a function of receiving information indicating the feeding state of the sheet in the sorting device 1 from the feed control unit 21. The main control unit 20 transmits an instruction of the sealing process for the sheet to the sealing control unit 30. Further, the main control unit 20 has a function of receiving information indicating the processing state of the sheet in the sealing device 2 from the sealing control unit 30.

As shown in FIG. 2, the main control unit 20 has a CPU 41, storage unit 42, interface (I/F) units 43 and 44 and the like.

The CPU 41 performs the control operation or data process of the main control unit 20. The CPU 41 realizes various processes by executing various programs stored in the storage unit 42. The storage unit 42 is a memory that stores various data items. The storage unit 42 is a memory such as a RAM, ROM, NVRAM or hard disk device.

In the example shown in FIG. 2, an application program 46*a*, command program 46*b*, maintenance program 46*c* and the like are installed in the storage unit 42 as programs executed by the CPU 41. Further, in the storage unit 42, parameters 47 used for various processes in the main control unit are stored.

The interface unit 43 is an interface that performs data communication with the determining unit 16, feed control unit 21 or sealing control unit 30. The interface unit 44 is an interface that performs data communication with the operating device 3.

As shown in FIG. 2, the determining unit 16 has a CPU 51, storage unit 52, interface (I/F) unit 53, image reading unit 54*a*, signal processing unit 55*a*, sensors 54*b*, 54*c*, . . . , 54*n*, signal processing units 55*b*, 55*c*, . . . , 55*n* and the like.

The CPU 51 performs various determination processes for the sheet. The CPU 51 realizes various processes by executing various programs stored in the storage unit 52. The storage unit 52 is a memory that stores various data items. The storage unit 52 is a memory such as a RAM, ROM, NVRAM or hard disk device. For example, in the storage unit 52, programs 56*a*, 56*b*, 56*c*, . . . , 56*d* executed by the CPU 51, parameters 58 and the like are stored. The interface unit 53 is an interface that performs data communication with the main control unit 20. For example, various determination results by the determining unit 16 are notified to the main control unit 20 via the interface unit 53.

The image reading unit 54*a* reads an image of the sheet to be determined. That is, the image reading unit 54*a* reads an image of the sheet fed by the configuration shown in FIG. 1. For example, the image reading unit 54*a* is configured by a color scanner that optically reads an image of the sheet as a color image. In the present embodiment, it is supposed that the image reading unit 54*a* reads color image information having pixels represented by signals of red (R), green (G) and blue (B). However, the image reading unit 54*a* may be configured to read image information represented by a plurality of pixels. The signal processing unit 55*a* processes image information read by the image reading unit 54*a*. The image information read by the image reading unit 54*a* is subjected to a preset process by the signal processing unit 55*a*. The image information processed by the signal processing unit 55*a* is supplied to the CPU 51.

The sensors 54*b*, 54*c*, . . . , 54*n* are sensors that detect various information items from the sheet. In a plurality of sensors 54*b*, 54*c*, . . . , 54*n*, a sensor that detects a signal indicating magnetic information in the sheet, a sensor that detects a signal indicating the thickness of the sheet, a sensor that detects a signal indicating fluorescent information in the sheet and the like are contained. The signal processing units 55*b*, 55*c*, . . . , 55*n* respectively process signals detected by the sensors 54*b*, 54*c*, . . . , 54*n*. For example, each of the signal processing units 55*b*, 55*c*, . . . , 55*n* is configured by an amplifier circuit that amplifies a signal, an AD converter circuit that converts an analog signal into a digital signal or a logic circuit that subjects a digital signal to a logical operation and the like.

In the example of FIG. 2, a stain determination program 56*a* and determination programs 56*b*, 56*c*, . . . , 56*n* are installed in the storage unit 52 as programs to be executed by the CPU 51. Further, parameters 58 used in various processes performed by the CPU 51 are also stored in the storage unit 52. In addition, a dictionary unit 59 is stored in the storage unit 52.

The CPU 51 functions as a stain determination unit by executing the stain determination program 56*a* stored in the storage unit 52. The determination programs 56*b*, 56*c*, . . . , 56*n* are programs corresponding to the sensors 54*b*, 54*c*, . . . , 54*n*. The determination programs 56*b*, 56*c*, . . . , 56*n* are programs used to determine various features of a sheet based on signals detected by the sensors 54*b*, 54*c*, . . . , 54*n*. That is, the CPU 51 functions as a determining unit that determines various features by executing the determination programs 56*b*, 56*c*, . . . , 56*n*.

The dictionary unit 59 stored in the storage unit 52 stores information that is referred to in the stain determination process realized by the stain determination program 56*a*. For example, in the dictionary unit 59, a transformation matrix (first transformation matrix) AY that separates an inherent variation component and a residual component other than the above component from a plurality of feature amounts in the image information and a transformation matrix (second transformation matrix) AC that extracts a variation component indicating the stain degree from the residual component obtained by removing the inherent variation component are stored.

As shown in FIG. 2, the feed control unit 21 has a CPU 61, storage unit 62, interface (I/F) unit 63 and the like.

The CPU 61 performs various control operations and data processes in the feed control unit 21. The CPU 61 realizes various processes by executing various program stored in the storage unit 62. The storage unit 62 is a memory that stores various data items. The storage unit 62 is configured by a memory such as a RAM, ROM, NVRAM or hard disk device.

In the example of FIG. 2, programs such as a feed control program 65 are installed in the storage unit 62 as programs executed by the CPU 51. Further, feed control parameters 66 used to perform a feed control operation in the feed control unit 21 are stored in the storage unit 62.

The interface unit 63 is an interface that performs data communication with the main control unit 20. For example, the CPU 61 performs a feed control operation for the sheet according to a feed instruction supplied from the main control unit 20 via the interface unit 63.

As shown in FIG. 2, the operating device 3 has a main body 3*a*, operating unit 3*b*, display unit 3*c* and the like.

The main body 3a has a CPU, memory, various interfaces and the like. The main body 3a realizes various processes by causing the CPU to execute various programs stored in the memory. The operating unit 3b is configured by an input device such as a keyboard, mouse or touch panel. Information input by operating the operating unit 3b by the operator is supplied to the main body 3a via an interface (not shown). The display unit 3c is configured by a display device such as a liquid crystal display device. The processing result of the sheet or the operation guidance for the operator is displayed on the display unit 3c.

In the operating device 3 with the above configuration, for example, the main body 3a outputs an operation instruction input by operating the operating unit 3b by the operator to the main control unit 20. Further, the main body 3a has a function of displaying information showing the processing result of the sheet required by the main control unit 20 on the display unit 3c.

Next, the configuration to perform the stain determination process in the determining unit 16 is explained.

Figure 3:
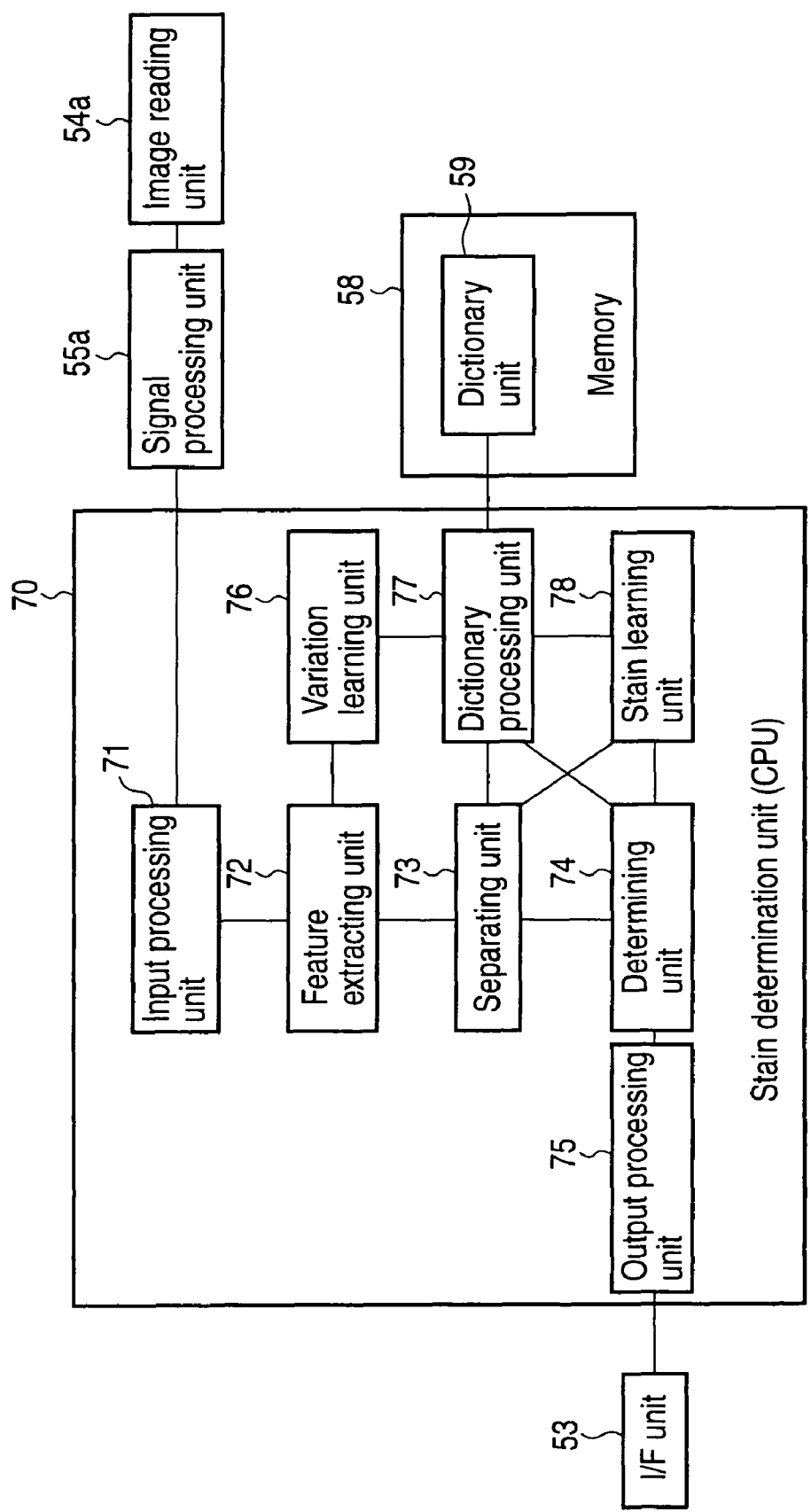
FIG. 3 is a block diagram showing an example of the configuration of a stain determination unit that performs a stain determination process.

FIG. 3 is a block diagram showing an example of the configuration of a stain determination unit 70 that performs a stain determination process.

As described above, in the determining unit 16, the CPU 51 functions as the stain determination unit 70 by executing a stain determination program 56a stored in the storage unit 52. The respective constituents of the stain determination unit 70 shown in FIG. 3 correspond to functions realized by causing the CPU 51 to execute the stain determination program 56a. However, in this case, part or all of the constituents of the stain determination unit 70 may be configured by hardware.

As shown in FIG. 3, the stain determination unit 70 includes an input processing unit 71, feature extracting unit 72, separating unit 73, determining unit 74, output processing unit 75, variation learning unit (first learning unit) 76, dictionary processing unit 77, stain learning unit (second learning unit) 78 and the like.

The input processing unit 71 performs a process of inputting image information. The input processing unit 71 inputs image information obtained by processing image information of a sheet read by the image reading unit 54a by means of the signal processing unit 55a. In the present embodiment, the input processing unit 71 inputs color image information (that is, a color image of the sheet) represented by a plurality of color signals (R signal, G signal and B signal). For example, the input processing unit 71 performs a process of inputting image information whose stain is to be determined in a stain determination process that will be described later. Further, the input processing unit 71 performs a process of inputting image information used as a sample in a learning process of the variation component or a learning process of the stain component that will be described later.

The feature extracting unit 72 extracts a plurality of feature amounts in the image information input by the input processing unit 71. For example, if the input image information is a color image formed of red (R), green (G) and blue (B), the feature extracting unit 72 calculates average values of concentrations for a plurality of plane color information items (R, G, B) in the image information as a plurality of feature amounts. However, the feature amounts extracted by the feature extracting unit 72 are not limited to the average values of concentrations for R, G, B. For example, the feature extracting unit 72 may extract a concentration average value in image information (IR) read by an infrared sensor as one feature amount. Further, the feature extracting unit 72 may extract not only concentration average values of various signals but also concentration dispersion values, concentration differential values and the like as feature amounts.

Further, the number of feature amounts extracted by the feature extracting unit 72 is not limited to three. For example, the feature extracting unit 72 can extract concentration average values of R, G, B, IR as four feature amounts. In addition, the feature extracting unit 72 can divide input image information into a plurality of small areas and may extract concentration average values of respective signals in the divided small areas as a plurality of feature amounts. The feature extracting unit 72 can independently extract the above various features or extract a plurality of feature amounts obtained by combining the above various features.

The variation learning unit 76 generates (learns) information used to separate (remove) an inherent variation component in the input image information. For example, when a read image of a printed matter (sheet) on which a specified pattern is printed is input, the variation learning unit 76 generates information used to extract a printing variation component generated in the printing process for a pattern of the sheet as an inherent variation component, for example. In other words, the variation learning unit 76 generates information used to extract an inherent variation component (printing variation component) that is not caused by a stain on the printed matter to be processed. In the present embodiment, it is supposed that the variation learning unit 76 generates a transformation matrix to extract an inherent variation component.

That is, the variation learning unit 76 subjects a plurality of feature amounts extracted from image information free from a stain to KL expansion as plural-dimensional feature vectors. The KL expansion is a main component analyzing process. Therefore, a subspace Y in which a main component as an inherent variation component and the other component (residual component) are separated is generated by subjecting the feature vectors to the KL expansion. The variation learning unit 76 calculates a transformation matrix AY used to separate the main component and residual component from image information of a printed matter to be processed. The transformation matrix AY is used to calculate a projection value (first partial vector) obtained by projecting feature vectors as a set of plural feature amounts extracted from the image information onto the subspace Y. As the projection value, components corresponding to the number of feature amounts (the number of dimensions) can be obtained. That is, the projection value becomes a value obtained by separating the inherent variation value and the other residual value.

The separating unit 73 performs a process of separating various components in the input image information. The separating unit 73 separates the main component and the other residual component in the input image information. For example, when three feature amounts are obtained, the separating unit 73 calculates a subspace (first partial vector) as a projection value obtained by projecting a 3-dimensional feature vector as a set of three feature amounts onto the subspace Y by use of the transformation matrix AY. That is, the separating unit 73 separates the set of three feature amounts in the image information into an inherent variation main component and residual component based on the 3-dimensional subspace generated by the variation learning unit 76. As a result, in the separating unit 73, the remaining residual component obtained by removing the inherent variation main component in the image information can be extracted.

The stain learning unit 78 generates (learns) information to separate (extract) a variation component caused by a stain in the input image information. In principle, in the image information from which the inherent variation component is removed, it is considered that the variation component is information indicating the stain degree. That is, the stain learning unit 78 generates information used to extract a variation component indicating the stain degree from the residual component from which the inherent variation component is removed. In the present embodiment, it is supposed that the stain learning unit 78 generates a transformation matrix AC to extract a stain variation component.

That is, the stain learning unit 78 subjects a set of residual components from which inherent variation components obtained from the stained image information are removed to KL expansion as position vectors. The KL expansion is a main component analyzing process. Therefore, a subspace C in which a stain component as a variation main component and the other component (residual component) are separated is generated by the KL expansion process for the position vectors (residual component vectors). The stain learning unit 78 calculates a transformation matrix AC used to extract a variation main component (stain component) in the vectors formed of the residual component obtained by removing an inherent variation component from image information of a printed matter to be processed. The transformation matrix AC is used to calculate a projection value (second partial vector) obtained by projecting position vectors formed of a set of residual components obtained by removing an inherent variation component from a set of plural feature amounts extracted from the image information onto the subspace C. In the projection value, the main component is used as a variation amount indicating the stain degree.

The determining unit 74 determines the stain degree. In the configuration example of FIG. 3, the determining unit 74 determines the stain degree based on the residual component from which the inherent variation component is separated by the separating unit 73. For example, when an inherent variation component and two residual components are obtained from a set of three feature amounts (feature vectors), the determining unit 74 calculates a subspace (second partial vector) as a projection value obtained by projecting a set of two residual components (2-dimensional position vector) onto the 2-dimensional subspace C by using the transformation matrix AC. In the projection value onto the subspace C, a stain variation component is extracted as a main component. Thus, the determining unit 74 determines a stain degree based on the magnitude of the stain variation component.

The output processing unit 75 performs a process of outputting a stain degree determination result by the determining unit 74. For example, the output processing unit 75 outputs information indicating the stain degree to the main control unit 20 via the interface unit 53. In this example, it is supposed to determine the stain degree of a sheet. Therefore, the output processing unit 75 outputs information indicating the stain degree of the sheet from which an image is read by the image reading unit 54a to the main control unit 20.

The dictionary processing unit 77 performs a process for the dictionary unit 59. For example, the dictionary processing unit 77 performs a process of reading out the transformation matrix AY or AC from the dictionary unit 59. Further, the dictionary processing unit 77 performs a process of storing the transformation matrix AY generated by the variation learning unit 76 or the transformation matrix AC generated by the stain learning unit 78 into the dictionary unit 59. In addition, the dictionary processing unit 77 performs a process of updating the transformation matrix AY or AC stored in the dictionary unit 59. For example, when a new transformation matrix AC is generated by the stain learning unit 78, the dictionary processing unit 77 performs a process of updating the transformation matrix AC stored in the dictionary unit 59.

Next, the operation of the stain determination unit 70 with the above configuration is explained.

The stain determination unit 70 performs processes that are roughly divided into a variation component learning process, stain component learning process and stain degree determination process.

The variation component learning process is a process of generating information used to extract an inherent variation component (that is, a variation component that is not caused by a stain) in the image information. For example, as the inherent variation component in the image information of a printed matter, a printing variation caused in the printing process for a printed matter is mainly considered. The variation component learning process is realized by causing the CPU 51 in the determining unit 16 to execute a variation component learning program 57a.

The stain component learning process is a process of generating information used to extract a stain component (that is, a variation component that is caused by a stain) contained in the image information. The stain component learning process is realized by causing the CPU 51 in the determining unit 16 to execute the stain component learning program 57b.

The stain degree determination process determines a stain degree depending on the magnitude of a stain component in information obtained by removing the inherent variation component from the image information. That is, in the stain degree determination process, an inherent variation component is removed from input image information based on information obtained by the variation component learning process. Further, in the stain degree determination process, the magnitude of the stain component (that is, the stain degree) is determined according to information from which the inherent variation component is removed based on information obtained by the variation component learning process. The stain component determination process is realized by causing the CPU 51 in the determining unit 16 to execute the determination program 57c.

Next, the variation component learning process, stain component learning process and stain degree determination process are explained in detail below. In the following explanation, it is supposed that banknotes are used as one example of sheets (printed matters) to be processed.

First, the variation component learning process is explained.

A sheet such as a banknote is formed by printing a preset pattern on a medium (sheet surface). The sheet obtained immediately after the preset pattern is printed thereon is set in a state in which it has no stain caused by usage (unused state). It is considered that the sheet is gradually stained at the circulation stage. Therefore, in the variation component learning process, image information items read from a plurality of sheets in the pre-circulation state (that is, in the unused state) are input as samples. In the variation component learning process, information indicating an inherent variation component is created from image information items read from a plurality of sheets in the unused state.

Figure 4:
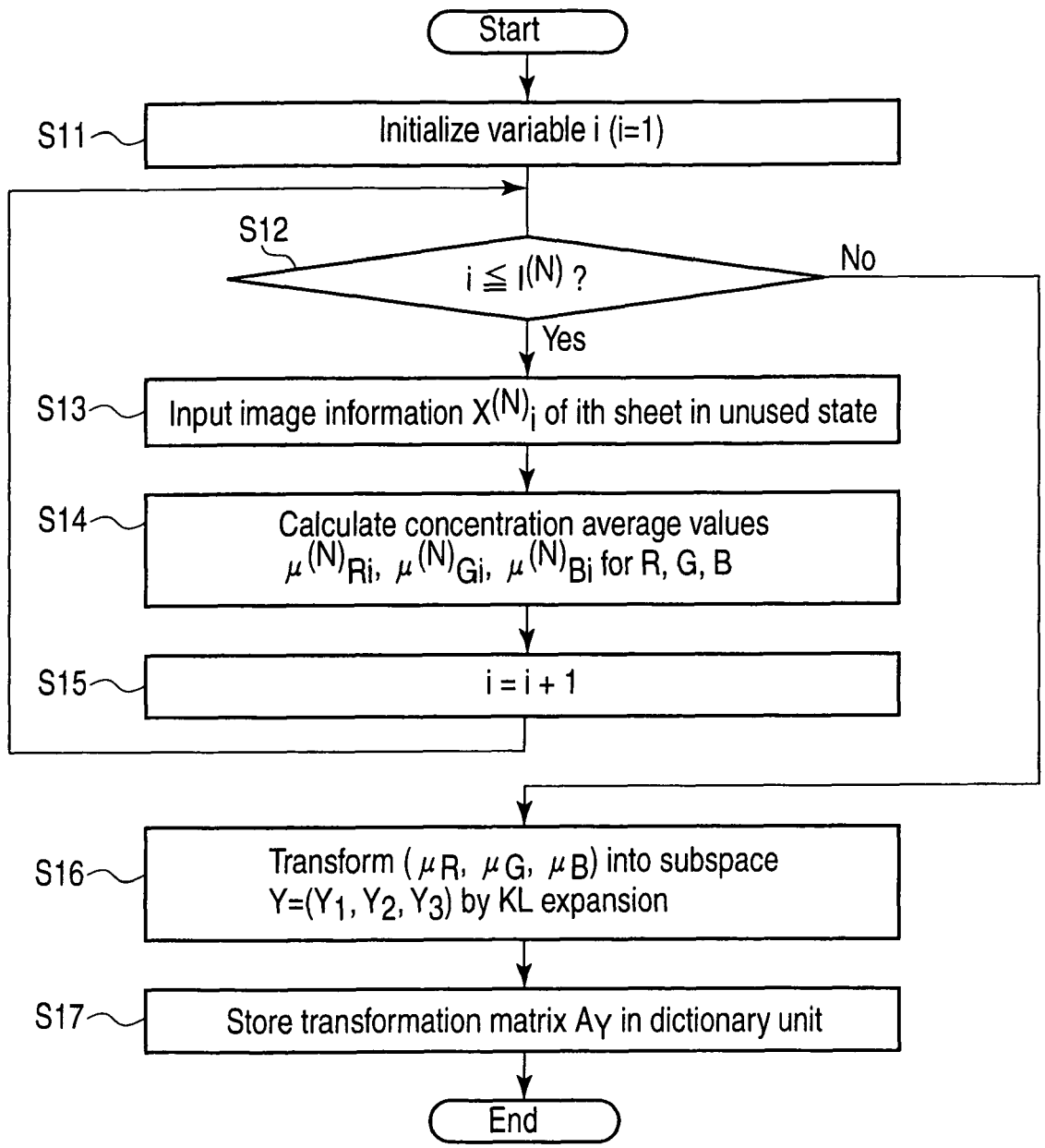
FIG. 4 is a flowchart for illustrating the flow of a variation component learning process in the stain determination unit.

FIG. 4 is a flowchart for illustrating the flow of the variation component learning process in the stain determination unit 70.

In this example, it is supposed that the number of image information items (images of sheets in the unused state) required as samples in the variation component learning process is I(N). At this time, I(N) is a natural number larger than or equal to 2. Further, I(N) indicates the number of samples used to generate a subspace Y that will be described later.

When the variation component learning process is started, the operator sets sheets of a number larger than or equal to I(N) in the unused state in the supply unit 10. Further, the operator inputs an operation instruction to the effect that the variation component learning process is started to the operating unit 3b of the operating device 3. Then, the main body 3a of the operating device 3 supplies a start instruction of the variation component learning process to the main control unit 20 of the sorting device 1.

When receiving the start instruction of the variation component learning process from the operating device 3, the main control unit 20 instructs the determining unit 16 to perform the variation component learning process. In the determining unit 16, the CPU 51 receives an execution instruction of the variation component learning process from the main control unit 20 via the interface unit 53. When receiving the execution instruction of the variation component learning process, the CPU 51 loads the variation component learning program 57a contained in the stain determination program 56a. Thus, the CPU 51 functions as the stain determination unit 70 that performs the variation component learning process.

Further, the main control unit 20 that receives the start instruction of the variation component learning process from the operating device 3 causes the feed control unit 21 to feed the sheets in the unused state set in the supply unit 10 one by one. Thus, the sheets in the unused state are fed to the determining unit 16 one by one. In the determining unit 16, images of the sheets fed in the unused state are sequentially read by the image reading unit 54a. Image information items read by the image reading unit 54a are sequentially supplied to the CPU 51 functioning as the stain determination unit 70 via the signal processing unit 55a.

The CPU 51 functioning as the stain determination unit 70 first sets "i=1" as an initial value of a variable i (step S11). For example, the variable i is set in an internal memory (not shown) of the CPU 51. When the variable i is smaller than or equal to I(N) (YES in the step S12), the input processing unit 71 of the stain determination unit 70 inputs image information X(N)i of an ith sheet read by the image reading unit 54a (step S13). The image information X(N)i input by the input processing unit 71 is supplied to the feature extracting unit 72. In this case, as described before, it is supposed that the image reading unit 54a reads the image of the sheet as a color image formed of R, G and B signals.

When receiving the image information X(N)i from the input processing unit 71, the feature extracting unit 72 calculates a plurality of feature amounts in the image information X(N)i (step S14). In this case, the feature extracting unit 72 calculates concentration average values (μ(N)Ri, μ(N)Gi, μ(N)Bi) of R, G, B of color image information in the image information X(N)i as a plurality of feature amounts. When a printed area (an area in which a preset pattern is printed) of the image information X(N)i can be specified, the feature extracting unit 72 can calculate concentration average values of R, G, B in the printed area of the image information X(N)i.

When the feature extracting unit 72 calculates the concentration average values (μ(N)Ri, μ(N)Gi, μ(N)Bi) in the image information X(N)i, the variable i is incremented and updated to "i=i+1" (step S15). When the variable i incremented is not larger than I(N) (NO in the step S12), the input processing unit 71 and feature extracting unit 72 repeatedly perform the process of calculating the concentration average values (μ(N) Ri, μ(N)Gi, μ(N)Bi) of R, G, B as a plurality of feature amounts in the image information items X(N)i (steps S12 to S15).

Further, if the incremented variable i is larger than I(N) (that is, i>I(N)), the variation learning unit 76 performs a process of generating a subspace used to extract inherent variation components from the input image information items of I(N) (step S16). That is, the variation learning unit 76 regards a set of plural feature amounts extracted from the image information items of I(N) by the feature extracting unit 72 as feature vectors of each image information. The variation learning unit 76 subjects the feature vectors of image information items of I(N) to main component analysis. In this embodiment, the variation learning unit 76 subjects the feature vectors of the respective image information items to the KL expansion as the main component analysis. The KL expansion is a process of converting the distribution of the feature vectors of image information items of I(N) to a subspace Y (Y=Y1, Y2, Y3). That is, the variation learning unit 76 converts the feature vectors (μ(N)Ri, μ(N)Gi, μ(N)Bi) of the image information items of I(N) to a subspace Y by the KL expansion (step S16).

FIG. 5 is a diagram schematically showing the relation between feature vectors (μ(N)Ri, μ(N)Gi, μ(N)Bi) as a set of plural feature amounts obtained from image information and a subspace Y (Y1, Y2, Y3). As shown in FIG. 5, Y1, Y2, Y3 configuring the subspace Y indicate components in three directions that intersect at right angles with one another. As described above, the subspace Y calculated by subjecting the feature vectors obtained from image information items of I(N) to the KL expansion most closely approximates the distribution of the feature vectors of I(N). The component Y1 in the subspace Y is a main component (variation component) that most closely approximates a variation in the feature vectors of I(N). In this example, the components Y2 and Y3 in the subspace Y are also referred to as residual components.

In the variation component learning process, input image information items of I(N) are information items read from N sheets in the unused state. In this case, if it is supposed that the sheets of I(N) in the unused state have no stain and the same image is printed thereon, a variation factor among the input image information items of I(N) can be regarded as a variation (that is, inherent variation component) occurring in the process of printing the image on the sheets. That is, a variation in image information items of I(N) read from the sheets of I(N) in the unused state is considered to be an inherent variation component in the input image information. Therefore, the Y1 component in the subspace Y can be regarded as a variation main component (an inherent variation component in the image printed on the sheets in the unused state) of the input image information items of I(N). In this case, it is supposed that a variation main component (inherent variation component) as the Y1 component is a printing variation main component of the printed matter.

If the Y1 component in the subspace Y is the printing variation main component of the image information, the inherent variation component (printing variation component) in certain image information can be easily extracted (or removed) by projecting the feature vectors of the image information onto the subspace Y. Therefore, the variation learning unit 76 generates a 3-dimensional transformation matrix AY to project the feature vectors of the image information onto the subspace Y. The transformation matrix AY generated by the variation learning unit 76 is stored into the dictionary unit 59 by the dictionary processing unit 77 (step S17). The transformation matrix AY stored in the dictionary unit 59 is information used to extract the printing variation main component as the inherent variation component from the image information of the sheet.

Next, the stain component learning process is explained.

The stain component learning process is a process of generating information used to extract a stain component in the image information read from the sheet. On the sheet such as a banknote, a stain or breakage occurs at the circulation stage (at the usage stage). In the variation component learning process, image information items read from a plurality of sheets in the after-circulation state (that is, in the used state) are input as samples. Information used to extract stain components is generated based on the samples. However, as described before, in the images printed on the sheets, printing variation components that are not related to the stain are contained. Therefore, in the stain component learning process, the printing variation components are removed by use of the transformation matrix AY to generate information used to extract stain components.

FIG. 6 is a flowchart for illustrating the flow of the stain component learning process in the stain determination unit 70.

In this example, it is supposed that the number of image information items (images of the sheets in the unused state) required as samples in the stain component learning process is I(U). In this case, I(U) is a natural number larger than or equal to 2 and indicates the number of samples to generate a subspace C that will be described later.

When the stain component learning process is started, the operator sets sheets of I(U) or more in the used state in the supply unit 10. Further, the operator inputs an operation instruction to the effect that the stain component learning process is started to the operating unit 3b of the operating device 3. Then, the main body 3a of the operating device 3 supplies a start instruction of the stain component learning process to the main control unit 20 of the sorting device 1.

When receiving the start instruction of the stain component learning process from the operating device 3, the main control unit 20 instructs the determining unit 16 to perform the stain component learning process. In the determining unit 16, the CPU 51 receives an execution instruction of the variation component learning process from the main control unit 20 via the interface unit 53. When receiving the execution instruction of the variation component learning process, the CPU 51 loads the stain component learning program 57b contained in the stain determination program 56a. Thus, the CPU 51 functions as the stain determination unit 70 to perform the stain component learning process.

Further, the main control unit 20 that has received the start instruction of the stain component learning process from the operating device 3 causes the feed control unit 21 to feed the sheets in the used state set in the supply unit 10 one by one. Thus, the sheets in the used state are fed to the determining unit 16 one by one. In the determining unit 16, images of the sheets fed in the used state are sequentially read by use of the image reading unit 54a. Image information items read by the image reading unit 54a are sequentially supplied to the CPU 51 functioning as the stain determination unit 70 via the signal processing unit 55a.

The CPU 51 functioning as the stain determination unit 70 first sets "i=1" as an initial value of a variable i (step S21). For example, the variable i is set in an internal memory (not shown) of the CPU 51. When the variable i is smaller than or equal to I(U) (YES in the step S22), the input processing unit 71 of the stain determination unit 70 inputs image information X(U)i of an ith sheet read by the image reading unit 54a (step S23). The image information X(U)i input by the input processing unit 71 is supplied to the feature extracting unit 72. In this case, as described before, it is supposed that the image reading unit 54a reads an image of the sheet as a color image formed of R, G and B signals.

When receiving the image information X(U)i from the input processing unit 71, the feature extracting unit 72 calculates a plurality of feature amounts in the image information X(U)i (step S24). In this example, the feature extracting unit 72 calculates concentration average values ($\mu(U)Ri$, $\mu(U)Gi$, $\mu(U)Bi$) of R, G, B of color image information in the image information X(U)i as a plurality of feature amounts. When a printed area of the image of the image information X(U)i can be specified, the feature extracting unit 72 can calculate concentration average values of R, G, B in the printed area as a plurality of feature amounts.

The concentration average values ($\mu(U)Ri$, $\mu(U)Gi$, $\mu(U)Bi$) in the image information X(U)i calculated by the feature extracting unit 72 are supplied to the separating unit 73. In this case, it is supposed that the concentration average values ($\mu(U)Ri$, $\mu(U)Gi$, $\mu(U)Bi$) are regarded as feature vectors of the image information X(U)i. When the feature vectors ($\mu(U)Ri$, $\mu(U)Gi$, $\mu(U)Bi$) of the image information X(U)i are supplied, the separating unit 73 reads out a transformation matrix AY stored in the dictionary unit 59 via the dictionary processing unit 77 (step S25). As is explained in the variation component learning process, the transformation matrix AY is to project the feature vectors onto the subspace Y.

When reading out the transformation matrix AY from the dictionary unit 59, the separating unit 73 transforms the feature vectors $\mu(U)$ ($\mu(U)Ri$, $\mu(U)Gi$, $\mu(U)Bi$) of the image information X(U)i into 3-dimensional values Y(U) (Y(U)1i, Y(U)2i, Y(U)3i) by using the transformation matrix AY (step S26). The 3-dimensional values Y(U) calculated by use of the transformation matrix AY are projection values obtained by projecting the feature vectors $\mu(U)$ onto the subspace Y. As described before, the Y1 component of the subspace Y is an inherent variation component (printing variation main component) that is not related to the stain. Therefore, the Y(U)1 component in the values obtained by projecting the feature vectors $\mu(U)$ of the image information X(U)i onto the subspace Y is considered to be an inherent variation component (printing variation main component). In other words, it is considered that the stain component in the image information X(U)i is contained in the residual components Y(U)2 and Y(U)3 in the values obtained by projecting the feature vectors $\mu(U)$ of the image information X(U)i onto the subspace Y.

The separating unit 73 stores the projection values Y(U) calculated by use of the transformation matrix AY into a buffer memory (not shown). When the projection values are calculated, the variable i is incremented and updated to "i=i+1" (step S27). When the incremented variable i is not larger than I(U) (NO in the step S22), the input processing unit 71 inputs next image information X(U)i. Thus, in the stain determination unit 70, the process of the steps S22 to S27 is repeatedly performed until the variable i becomes larger than I(U).

Further, if the incremented variable i is larger than I(U) (that is, i>I(U)), the stain learning unit 78 performs a process of generating a subspace C used to extract stain components from the projection values of I(U) calculated by the separating unit 73 (step S28). That is, the stain learning unit 78 regards a set of Y(U)2i and Y(U)2i in the projection values calculated by the separating unit 73 as 2-dimensional position vectors (Y(U)2i, Y(U)3i). The stain learning unit 78 subjects the N 2-dimensional position vectors (Y(U)2i, Y(U)3i) to the main component analyzing process.

In this embodiment, the stain learning unit 78 subjects the N 2-dimensional position vectors (Y(U)2i, Y(U)3i) to the KL expansion process as the main component analyzing process. The KL expansion process is a process of transforming the distribution of 2-dimensional position vectors of I(U) to a subspace C (C2, C3). That is, the stain learning unit 78 transforms the N 2-dimensional position vectors (Y(U)2i, Y(U)3i) from which the inherent variation component (printing variation main component) separated by the separating unit 73 is removed to the subspace C by using the KL expansion process.

Figure 7:
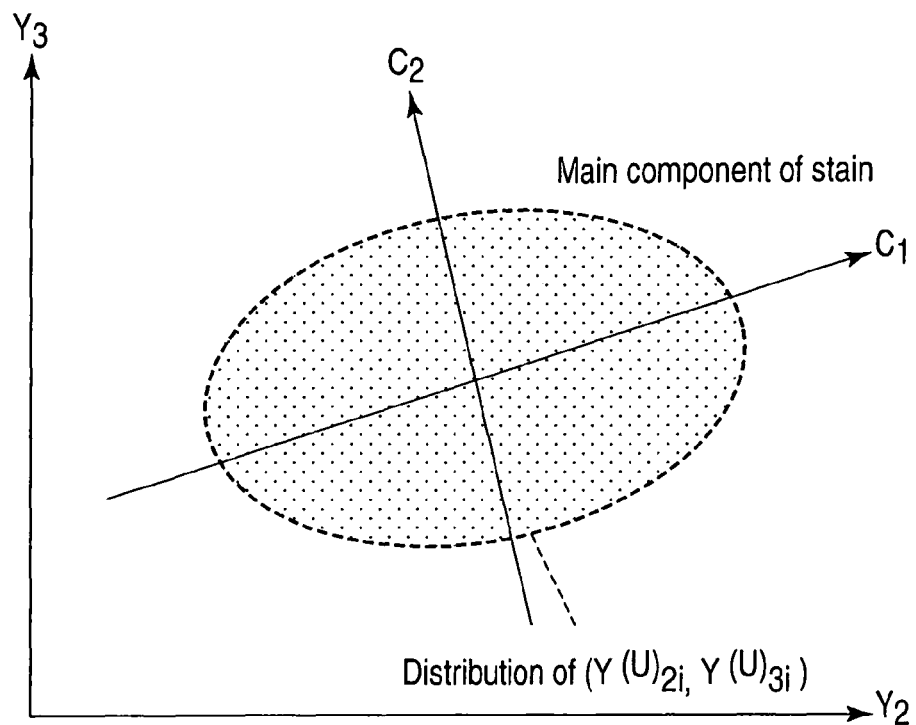
FIG. 7 is a diagram schematically showing the relation between position vectors obtained by eliminating an inherent variation component and a subspace.

FIG. 7 is a diagram schematically showing the relation between N position vectors from which inherent variation components are removed and a subspace C (C1, C2).

As shown in FIG. 7, C1 and C2 configuring the subspace C are components in directions that intersect at right angles with each other. As described before, the subspace C calculated by subjecting the feature vectors obtained from N image information items to the KL expansion most closely approximates the distribution of the N position vectors. C1 in the subspace C is a main component that most closely approximates a variation component of the N position vectors.

In this case, in the 2-dimensional position vector, an inherent variation component (printing variation main component) that is not caused by the stain is removed. In the subspace C obtained by subjecting the 2-dimensional position vectors to the KL expansion process, a variation component appearing as the main component is considered to indicate a stain component. Therefore, the C1 component in the subspace C can be regarded as a stain main component in the image information of the sheet (a stain component from which the printing variation component in the image printed on the sheet set in the use state is removed).

If the C1 component in the subspace C is a stain component in the image information, the stain component in the image information can be extracted by projecting the feature vectors of certain image information onto the subspace Y and then projecting the position vectors except the inherent variation component onto the subspace C. For this purpose, the stain learning unit 78 generates a 2-dimensional transformation matrix AC to project 2-dimensional position vectors onto the subspace C. The transformation matrix AC generated by the stain learning unit 78 is stored in the dictionary unit 59 by the dictionary processing unit 77 (step S29). The transformation matrix AC held in the dictionary unit 59 is information used to extract a stain component from the image information of the sheet.

Next, the stain degree determination process is explained.

The stain degree determination process is a process of determining the stain degree in the image information read from the sheet that is subjected to the stain degree determination process. As described above, in the image information read from the sheet set in the used state, a variation component (for example, printing variation component) that is not related to a stain and a stain component caused by a stain are contained. Therefore, in the stain degree determination process, a process of excluding an inherent variation component in the image information read from the sheet and a process of extracting a stain component from information from which the inherent variation component is removed are contained. Further, in the stain degree determination process, it is assumed that a sheet that is actually used as a sheet to be processed is used. Also, in the stain degree determination process, a process (online learning process) of updating information (transformation matrix AC) used to extract a stain component based on information obtained in the stain degree determination process may be performed.

FIG. 8 is a flowchart for illustrating the flow of the stain degree determination process in the stain determination unit 70.

In this example, it is supposed that the stain degree determination process is performed for a sheet to be sorted in the above sheet processing system. Further, it is also supposed that the number of sheets whose stain degree is to be determined (that is, the number of sheets set in the supply unit 10) is I(T).

When the sorting process containing the stain degree determination process is started, the operator sets sheets of I(T) to be processed in the supply unit 10. Further, the operator inputs an operation instruction to the effect that the sheet sorting process containing the stain degree determination process is started to the operating unit 3b of the operating device 3. Then, the main body 3a of the operating device 3 informs the main control unit 20 of the sorting device 1 that a start instruction of the process with respect to the sheets is issued. In the process such as the sorting process with respect to the sheets, the determining unit 16 performs various determination processes other than the stain degree determination process. Therefore, the main control unit 20 instructs the determining unit 16 to perform various determination processes containing the stain degree determination process. However, in this example, the stain degree determination process in the determining unit 16 is explained.

That is, when receiving an execution instruction of the stain degree determination process from the main control unit 20 via the interface unit 53, the CPU 51 of the determining unit 16 loads a stain degree determination program 57c contained in the stain determination program 56a. Thus, the CPU 51 functions as the stain determination unit 70 to perform the stain degree determination process.

Further, the main control unit 20 that has received the process starting instruction from the operating device 3 causes the feed control unit 21 to feed sheets to be processed and set in the supply unit 10 one by one. Thus, the sheets to be processed are fed to the determining unit 16 one by one. In the determining unit 16, images of the sheets to be processed and fed are sequentially read by the image reading unit 54a. Image information items read by the image reading unit 54a are sequentially supplied to the CPU 51 functioning as the stain determination unit 70 via the signal processing unit 55a.

The CPU 51 functioning as the stain determination unit 70 first sets "i=1" as an initial value of a variable i (step S31). For example, the variable i is set in an internal memory (not shown) of the CPU 51. When the variable i is smaller than or equal to I(T) (YES in the step S32), the input processing unit 71 of the stain determination unit 70 inputs image information X(T)i of an ith sheet read by the image reading unit 54a (step S33). The image information X(T)i input by the input processing unit 71 is supplied to the feature extracting unit 72. In this case, as described before, it is supposed that the image reading unit 54a reads the image of the sheet as a color image formed of R, G and B signals.

When receiving the image information X(T)i from the input processing unit 71, the feature extracting unit 72 calculates a plurality of feature amounts in the image information X(T)i (step S34). In this example, the feature extracting unit 72 calculates concentration average values ($\mu(T)Ri$, $\mu(T)Gi$, $\mu(T)Bi$) of R, G, B of color image information in the image information X(T)i as a plurality of feature amounts. When an area (printed area) in which a pattern is printed in the image information X(T)i can be specified, the feature extracting unit 72 may calculate concentration average values of R, G, B in the printed area as a plurality of feature amounts.

The concentration average values ($\mu(T)Ri$, $\mu(T)Gi$, $\mu(T)Bi$) in the image information X(T)i calculated by the feature extracting unit 72 are supplied to the separating unit 73. In this case, it is supposed that each set of the concentration average values ($\mu(T)Ri$, $\mu(T)Gi$, $\mu(T)Bi$) is regarded as a feature vector $\mu(T)$ of the image information X(T)i. When receiving the feature vector $\mu(T)$ of the image information X(T)i, the separating unit 73 reads out the transformation matrix AY stored in the dictionary unit 59 via the dictionary processing unit 77 (step S35). As is explained in the variation component learning process, the transformation matrix AY is used to project the feature vector μ(T) onto the subspace Y.

When reading out the transformation matrix AY from the dictionary unit 59, the separating unit 73 transforms the feature vectors μ(T) (μ(T)Ri, μ(T)Gi, μ(T)Bi) of the image information X(T)i into 3-dimensional values Y(T) (Y(T)1i, Y(T)2i, Y(T)3i) by using the transformation matrix AY (step S36). The 3-dimensional values Y(T) calculated by using the transformation matrix AY are projection values obtained by projecting the feature vectors μ(T) of the image information X(T)i onto the subspace Y. As described before, the Y1 component of the subspace Y is an inherent variation component (printing variation main component) that is not related to the stain. Therefore, the Y(T)1i component in the values Y(T) obtained by projecting the feature vectors μ(T) of the image information X(T)i onto the subspace Y is considered to be an inherent variation component (printing variation main component). In other words, it is considered that the stain component in the image information X(T)i is contained in the residual components Y(T)2i and Y(T)3i in the projection values Y(T).

When the projection value onto the subspace Y is calculated, the separating unit 73 further reads out the transformation matrix AC stored in the dictionary unit 59 via the dictionary processing unit 77 (step S37). As is explained in the stain component learning process, the transformation matrix AC is used to project the 2-dimensional position vectors (Y2, Y3) obtained by removing the inherent variation component Y1 from the feature vectors onto the subspace.

When reading out the transformation matrix AC from the dictionary unit 59, the separating unit 73 treats Y(T)2i and Y(T)3i among the projection values as 2-dimensional position vectors (Y(T)2i, Y(T)3i). The separating unit 73 transforms the 2-dimensional position vectors (Y(T)2i, Y(T)3i) to 2-dimensional values (C(T)1i, C(T)2i) by using the transformation matrix AC (step S38). The 2-dimensional values (C(T)1i, C(T)2i) calculated by using the transformation matrix AC are projection values obtained by projecting the 2-dimensional position vectors from which the inherent variation component is removed onto the subspace C. As described before, the C1 component of the subspace C is a stain main component that most closely approximates a variation main component. Therefore, the stain degree in the image information X(T)i can be determined based on the magnitude of C(T)1i.

That is, the determining unit 74 determines the stain degree (that is, the stain degree of the ith sheet) in the image information X(T)i based on the value of C(T)1i obtained by the separating unit 73 (step S39). In this case, it is supposed that the determining unit 74 determines whether the sheet is clean or stained as the stain degree determination result for the ith sheet. That is, the determining unit 74 determines whether the sheet is clean or stained by comparing the value of C(T)1i with a preset threshold value. However, it is possible for the main control unit 20 to determine whether the sheet is treated as a true sheet or false sheet (whether the sheet is clean or stained). In this case, the determining unit 74 may output the numerically expressed stain degree to the main control unit 20 as a determination result.

Figure 9:
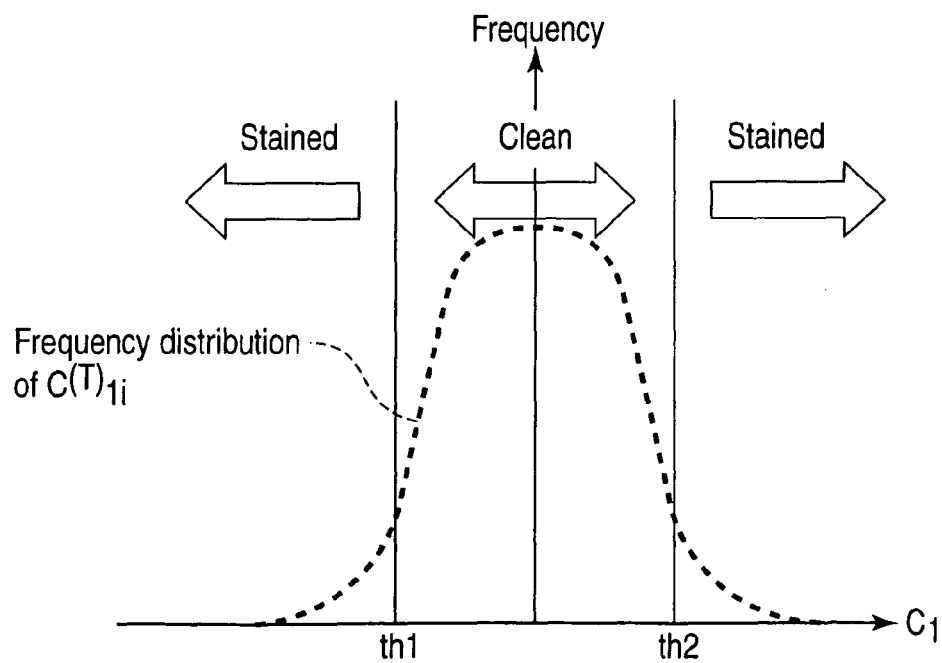
FIG. 9 is a diagram showing an example of a stain determination process for values of the stain component.

FIG. 9 is a diagram showing an example of the stain determination process for the value (the value of C(T)1i) of the stain component.

In the example of FIG. 9, the frequency of occurrence of the value of C(T)1i is shown. Further, in the example of FIG. 9, an example of setting of threshold values (TH1 and TH2) used to determine the stain degree (clean or stained) for the value of C(T)1i is shown. The threshold values TH1 and TH2 are set as one pair. That is, in the example of FIG. 9, if the value of C(T)1i lies in the range between TH1 and TH2, the sheet is determined to be clean and if the value of C(T)1i is smaller than TH1 or larger than TH2, the sheet is determined to be stained. The threshold values TH1 and TH2 are values that are adequately set according to the operating condition of the sheet processing system. As the difference between the threshold values TH1 and TH2 (the distance between TH1 and TH2) becomes smaller, it becomes more difficult to determine the sheet clean.

The determining unit 74 may indicate the stain level of the sheet in preset plural level ranges. In this case, the determining unit 74 sets the stain level of the sheet into one of a preset number of level ranges based on the value C(T)1i and a plurality of threshold values used for division into a preset number of level ranges. For example, by setting a plurality of pairs such as the pair of threshold values shown in FIG. 9, the operating condition in which the sheets are divided into a plurality of stain levels can be realized. Further, the threshold values TH1 and TH2 can be set according to the frequency of occurrence of the value of C(T)1i. In this case, for example, the operating condition in which all of the sheets to be processed are divided into clean sheets and stained sheets with a preset ratio can be realized.

The stain degree determination result by the determining unit 74 is output to the main control unit 20 by the output processing unit 75 (step S40). When the stain degree determination result is output, the variable i is incremented and updated to "i=i+1" (step S41). When the variable i incremented is not larger than I(T) (NO in the step S32), the input processing unit 71 inputs next image information X(T)i. Thus, in the stain determination unit 70, the process of the steps S32 to S41 is repeatedly performed until the variable i becomes larger than I(T). Further, if the variable i incremented is larger than I(T) (that is, images of the sheets set in the supply unit 10 are used up), the determining unit 74 terminates the stain degree determination process for the sheets of I(T).

As described above, in the stain degree determination process, image information of a printed matter is input, a plurality of feature amounts are extracted from the input image information, a set of the plurality of extracted feature amounts is regarded as a feature vector, the feature vector is transformed into a first partial vector (first subspace) by using the first transformation matrix stored in the memory, a first residual component obtained by removing a first main component (inherent variation component, printing variation component) from the first partial vector is extracted, a set of the first residual components is regarded as a residual vector, the residual vector is transformed into a second partial vector (second subspace) by using the second transformation matrix stored in the memory, a second main component is extracted from the second partial vector and then the stain degree of the printed matter is determined based on the second main component extracted.

Next, the online learning function in the stain degree determination process is explained.

In the stain degree determination process of the steps S31 to S41, an updating process of the transformation matrix AC can be additionally provided. That is, in the stain component learning process, a transformation matrix AC used to extract a stain component by using a sheet in the used state, that is, a stained sheet as a sample is created. On the other hand, in the stain degree determination process, it is supposed that the sheet to be processed is a sheet in the used state. That is, the sheet to be processed in the stain degree determination process is not basically different from the sheet input as a sample in the stain component learning process. Therefore, in the stain degree determination process, the stain degree can be determined and, at the same time, the stain component learning process (updating process of the transformation matrix AC) can be performed. Thus, in the stain degree determination process, the operation of performing the stain degree determination process and stain component learning process is referred to as an online learning function.

In the online learning function, the transformation matrix AC is updated according to the state of the sheet actually used. Therefore, in the online learning function, the stain degree determination process with high precision can be performed according to the actual operating condition. However, when a sheet having a particular stain or a sheet that is badly stained is to be processed, a preferable transformation matrix cannot be acquired in some cases in the online learning function. Therefore, it is preferable to switch the online learning function to be made effective or ineffective according to the intention of the operator or manager of the sheet processing system. Next, an example of a stain degree determination process when the online learning function is set effective is explained below.

Figure 10:
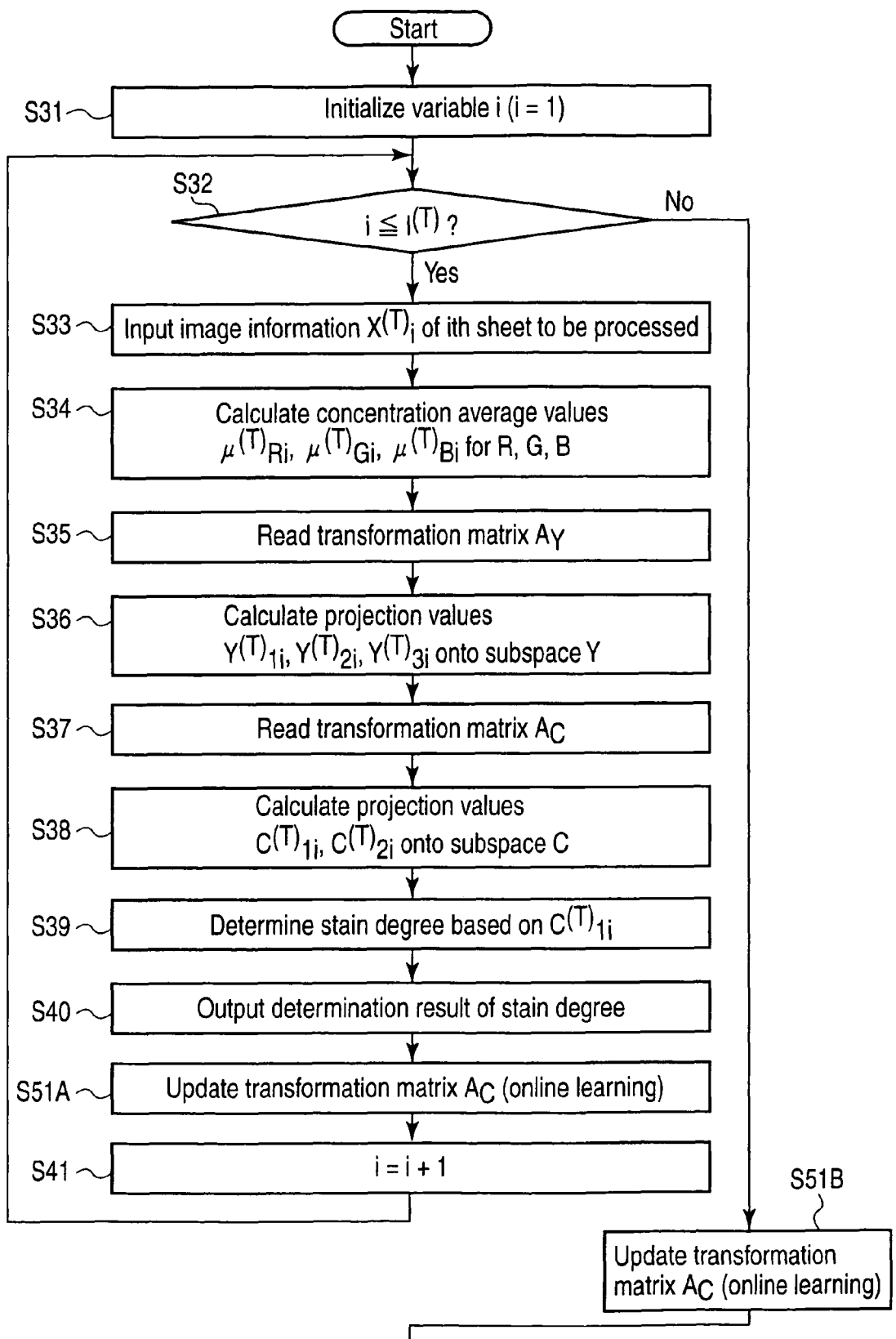
FIG. 10 is a flowchart for illustrating the flow of a stain degree determination process used to perform an online learning function.

FIG. 10 is a flowchart for illustrating the flow of the stain degree determination process to perform the online learning function.

That is, as the online learning function, the process of updating the transformation matrix AC is additionally provided in the stain degree determination process. In the flowchart of FIG. 10, the step S51A or step S51B as the online learning function (updating process of the transformation matrix AC) is additionally provided in the flowchart of FIG. 8. However, the step S51A or S51B shown in FIG. 10 is performed as the online learning function. The process of the steps S31 to S41 shown in FIG. 10 is substantially the same as that of FIG. 8, and therefore, the detailed explanation thereof is omitted.

As described before, the transformation matrix AC is information used to extract a stain component. That is, the transformation matrix AC is information used to calculate values $(C(T)1i, C(T)2i)$ obtained by projecting 2-dimensional position vectors $(Y(T)2i, Y(T)3i)$ except an inherent variation component onto the subspace C. Further, the subspace C is information obtained by subjecting the 2-dimensional position vectors $(Y2, Y3)$ to KL expansion.

Therefore, in the stain degree determination process, the stain learning unit 78 can update the transformation matrix AC each time it calculates "$C(T)1i$" as the stain degree of each sheet (step S51A). In this case, the stain learning unit 78 generates a transformation matrix AC(T)i by performing the same process as the process of the steps S28 and S29 each time 2-dimensional position vectors $(Y(T)2i, Y(T)3i)$ obtained from image information of an ith sheet are acquired. In this case, the stain learning unit 78 updates the transformation matrix AC stored in the dictionary unit 59 each time the stain degree for the image information of the ith sheet is determined by combining a newly created transformation matrix AC(T)i and the existing transformation matrix AC.

In the stain degree determination process, the stain learning unit 78 can update the transformation matrix AC after the process of determining the stain degrees for the sheets of I(T) is terminated (step S51B). In this case, the stain learning unit 78 stores all of 2-dimensional position vectors $(Y(T)2i, Y(T)3i)$ obtained from image information items of sheets of I(T). Thus, the stain learning unit 78 creates a transformation matrix AC(T) by performing the same process as the process of the steps S28 and S29. In this case, the stain learning unit 78 updates the transformation matrix AC stored in the dictionary unit 59 by combining a newly created transformation matrix AC(T) and the existing transformation matrix AC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stain determination apparatus comprising:
a feature extracting unit which extracts a plurality of feature information items from an image information containing an inherent variation;
a separating unit which separates the plurality of feature information items extracted from the image information by the feature extracting unit into a component of the inherent variation and a residual component other than the inherent variation component, and
a determining unit which extracts a component of a stain variation indicating a stain degree in the image information from the residual component obtained by the separating unit and determines a stain degree in the image information based on a magnitude of the extracted stain variation component,
wherein the image information is image information obtained by reading a printed matter on which a specified pattern is printed, the inherent variation is a printing variation caused by a variation in printing for the printed matter, and the stain variation is a variation in a stain caused on the printed matter by an external factor, and
wherein the separating unit transforms a set of the plurality of feature information items into a first partial vector containing the inherent variation component and a plurality of other residual components, and the determining unit transforms a set of the plurality of residual components into a second partial vector containing a stain variation component and a component other than the above component and determines a stain degree in the image information based on a magnitude of the stain variation component in the second partial vector.

2. The apparatus according to claim 1, further comprising a dictionary unit which stores first and second transformation matrices,
wherein the separating unit transforms vector formed of a set of the plurality of feature information items into the first partial vector by use of the first transformation matrix, and the determining unit transforms a set of a plurality of residual components except the inherent variation component in the first partial vector into the second partial vector by use of the second transformation matrix.

3. A stain determination apparatus comprising:
a feature extracting unit which extracts a plurality of feature information items from an image information containing an inherent variation;
a separating unit which separates the plurality of feature information items extracted from the image information by the feature extracting unit into a component of the inherent variation and a residual component other than the inherent variation component;
a determining unit which extracts a component of a stain variation indicating a stain degree in the image information from the residual component obtained by the separating unit and determines a stain degree in the image information based on a magnitude of the extracted stain variation component; and a first learning unit which generates a first transformation matrix to transform a set of the plurality of feature information items in the image information into the inherent variation component and a plurality of other residual components based on main component analysis for a set of a plurality of feature information items in an image information containing no stain.

4. The apparatus according to claim 3, further comprising a second learning unit which generates a second transformation matrix to transform a residual component obtained by removing the inherent variation component from a set of the plurality of feature information items in an image information containing a stain into a stain variation component and a component other than the above component.

5. A sheet processing apparatus comprising:
   a reading unit which reads an image of a sheet on which a specified pattern is printed;
   a feature extracting unit which extracts a plurality of feature information items from image information of the sheet read by the reading unit;
   a separating unit which separates the plurality of feature information items extracted from the image information by the feature extracting unit into an inherent variation component and a residual component other than the inherent variation component;
   a determining unit which extracts a stain variation component indicating a stain degree in the image information from the residual component obtained by the separating unit and determines a stain degree in the image information based on a magnitude of the extracted stain variation component;
   a processing unit which processes the sheet based on a result of determination of the stain degree by the determining unit; and
   a first learning unit which generates a first transformation matrix to transform a set of the plurality of feature information items in the image information into the inherent variation component and a plurality of other residual components based on main component analysis for a set of a plurality of feature information items in an image information read from a sheet containing no stain by means of the reading unit.

6. The apparatus according to claim 5, further comprising a second learning unit which generates a second transformation matrix to transform a residual component obtained by removing the inherent variation component from a set of the plurality of feature information items in the image information read from a sheet which is supposed to contain a stain by means of the reading unit into a stain variation component and a component other than the above component.

* * * * *